United States Patent [19]

Wintermantel

[11] 4,132,577

[45] Jan. 2, 1979

[54] PROCESS FOR PRODUCING HOLLOW PROFILED STRUCTURES, AND STRUCTURES PRODUCED THEREBY

[76] Inventor: Erich Wintermantel, 10 Elsa-Brandströmstrasse, 5300 Bonn-Bad Godesberg, Fed. Rep. of Germany

[21] Appl. No.: 695,960

[22] Filed: Jun. 14, 1976

[30] Foreign Application Priority Data

Jul. 1, 1975 [DE] Fed. Rep. of Germany ....... 2529185

[51] Int. Cl.² .................. B29C 1/08; B29C 17/06; B32B 3/20; B32B 3/22
[52] U.S. Cl. .............................. 156/156; 264/257; 264/314; 264/317; 428/166; 428/188
[58] Field of Search ............... 428/166, 188; 264/314, 264/317, 257; 156/156

[56] References Cited

U.S. PATENT DOCUMENTS

| 2,995,781 | 8/1961 | Sipler | 264/314 |
|---|---|---|---|
| 3,228,822 | 1/1966 | Norman | 428/188 |
| 3,307,312 | 3/1967 | Kreibaum | 428/188 |
| 3,388,509 | 6/1968 | Mora | 264/314 |
| 3,530,021 | 9/1970 | Reechl | 428/188 |
| 3,544,417 | 12/1970 | Corgine | 428/188 |
| 3,560,323 | 2/1971 | Zivickert | 428/188 |
| 3,565,983 | 2/1971 | Eigenmann | 264/314 |
| 3,629,030 | 6/1968 | Ash | 264/314 |
| 3,641,230 | 2/1972 | Jenks | 264/314 |
| 3,813,313 | 5/1974 | Feucht et al. | 156/156 |

FOREIGN PATENT DOCUMENTS

| 236548 | 2/1959 | Australia | 428/188 |
|---|---|---|---|
| 630654 | 7/1963 | Belgium | 428/188 |
| 1335484 | 7/1963 | France | 428/188 |

*Primary Examiner*—J.C. Cannon
*Attorney, Agent, or Firm*—Ross, Ross & Flavin

[57] ABSTRACT

In making a hard multi-tubular structure, one starts with a flat woven or knitted hose fabric comprising a plurality of side-by-side hoses; the hoses of the fabric are caused to expand and to set in their expanded configurations, which may be circular or substantially square in cross-section by a hardenable medium with which the fabric is impregnated or coated. Optionally, a hardenable covering and/or filling is provided over or in the hoses.

5 Claims, 22 Drawing Figures

PROCESS FOR PRODUCING HOLLOW PROFILED STRUCTURES, AND STRUCTURES PRODUCED THEREBY

FIELD OF THE INVENTION

This invention relates to hard multi-tubular structures, a method of producing such structures, and their use.

SUMMARY OF THE INVENTION

Hard multi-tubular structures consist of several hollow sections which are connected to one another, the walls of the hollow sections being formed from a woven fabric or a knitted fabric which, to maintain it in its desired shape, is provided with an impregnation or coating. This impregnation or coating consists, for example, of a cold-setting or thermo-setting plastics material. Other substances or solutions which harden after the impregnating or coating of the fabric can be used. The fabric may consist of textile threads or bundles of textile threads. Generally glass fibres or synthetic fibres or mixtures thereof are used. By appropriate selection of the type, quality and amount of the fibres and the impregnation or coating, as well as by choice of the type of fabric weave, multi-tubular structures of different characteristics, and/or cross-sectional geometries (hereinafter referred to as "hollow sections" or "hard tube network") which are open or closed between the fabric meshes formed by the warp threads and weft threads, cam be produced.

Such hard tube networks are frequently used as lightweight construction elements, for example in buildings, for protection against moisture and/or noise and/or against heat and cold. One can, for examples, use the multi-tubular structures of the invention for building a cavity wall or the like having an outer shell as a facade covering or terrace covering which clads and protects the body of the building and gives it its appearance. The multi-tubular structure is installed in front of the usual supporting shell and an outer shell is then applied to the multi-tubular structure which forms a plane of separation between the two shells but at the same time serves as a connecting element. This construction guarantees protection against heat and cold, against noise and against damp penetration. The protection against moisture arises from the fact that the hollow sections extending perpendicularly within the facade or substantially horizontally between the terrace covering and the body of the building communicate respectively by their lowermost, and possibly additionally by their uppermost open ends, with the atmosphere. Any surface water penetrating through the facade or the terrace as far as the said plane of separation, and any condensate which may arise from within, through vapour diffusion, can flow away or evaporate into the atmosphere. The protection against noise emerges from the multi-shell construction and from the attenuation characteristics of the hollow sections as a result of their shapes and properties. The hollow multi-tubular structure, is moreover, a poor heat conductor, because it has, in comparison with conventional load-bearing building materials, a high valume to weight ratio; it thus serves to provide protection against heat and cold. In this respect, the hard multi-tubular structure of the invention can be formed not only onto flat but also onto arcuate surfaces. The hard multi-tubular structure can be used, for example, also as trickling body for use in the chemical industry and in cooling tower construction, as a separator in the case of gas and liquid preparation, for gas and water drainage in landscaping and horticulture and as a semi-finished carrying, supporting or core-body product for use in sandwich-like panels or as sound-absorbing element.

The invention makes a start from the problem of producing an inherently-stable hollow multi-tubular structure economically and of so forming it that it can be used in many ways. To solve this problem, the present invention provides a method of making a hard multi-tubular structure, which comprises producing a flat hose fabric, woven or knitted so as to be composed of a plurality of side-by-side hoses, expanding the hoses to form them into hollow sections (e.g. into tubes) and providing them with a hardening coating or impregnation.

Because use is made of the hose fabric, secure connection together of the hollow sections, formed by expanding or inflation of the tubes, is achieved.

In the hose fabric, the weft threads form respectively the upper part of the wall of the one hollow section and the lower part of the wall of the next adjacent hollow section, and so on across the width of the fabric; in other words, each weft thread has, in simplified representation, a sinusoidal course. These weft threads intersect at each junction between two adjacent tubes.

Flat multi-tubular hose fabrics can, of course, be produced simply at a practically high working speed. Starting from such a flat hose fabric, it is proposed by the invention, therefore to expand or inflate the flat hoses into hollow sections, e.g. into tubes, and in so doing, for maintenance of them in their shapes obtained in this way and for increasing their stiffness, to provide the same with a hardening coating or impregnation. The expanding is possible in various ways; depending on the type of expansion, a series of different uses can be achieved.

Thus, in a development of the method of the invention, it is proposed initially to provide the flat hose fabric with a hardening coating, for example by immersing the same in a hardenable liquid or spraying the same with such a liquid, and then to expand or inflate the flat hoses of the hose fabric to form them into the hollow sections and to keep them expanded until the hardening reaction of the coating substance has developed sufficiently for the spatial shape of the expanded hollow sections to be ensured.

In further development of the method of the invention the flat hose fabric can first be expanded or blown up, for the forming it into the desired spatial shape, the hardening impregnant or substance then being applied to the expanded hollow sections.

Starting from these two basic propositions, in further development of the method of the invention it is proposed to introduce inflatable tubes into the flat hose fabric, these inflatable tubes being made, for example, of plastic material, and being inflatable to form the hoses into the hollow-sections. The material properties of the inflatable tubes can be such that a secure bond with the hardening coating or impregnation substance may, or may not, arise. Depending on the intended use of the finished structure, the inflatable tubes may be, for example, permeable, vapour-blocking, coloured, reflecting or absorbent.

In an additional development of the method of the invention, it is proposed that, simultaneously with the inflation of the inflatable tubes introduced into the hose fabric, insulating substances, such as mineral fibres, are introduced into these tubes; the inflation and the filling of the tubes can also be effected together, for example by injecting a hard or soft foam plastics material therein. The multi-tubular structure, with or without inflatable tubes bonded therein can, if desired, be filled wholly or partially when in the inherently stable state. The multi-tubular structure thus filled, has, for example, increased strength and/or heat insulation and/or damping and/or sound absorption properties, as compared with the non-filled structure, and may, by appropriate selection of the filling, be specifically adapted for particular uses.

In a further development of the method of the invention it is proposed that the inflatable tubes should consist of a thermoplastic shrink foil and that after hardening of the coating or impregnant, to fix the hollow section shape, the structure should be heated so that the inflatable tubes are caused to tear open. In this event, the heating can be applied at one side. If the heating is effected at only one side, in this way, a tubular structure emerges which is particularly suitable for ground drainage, by way of example of sports grounds. Air, water and moisture can penetrate through the structure into the hollow sections which are formed at their upper sides with numerous apertures and which are connected together by the weft threads, this air, water or moisture being caused to flow away through the hollow sections because the lower surfaces thereof are closed or sealed by the inflatable tubes and liquids and/or gases can escape into the atmosphere only through the upper part of each such section.

Such a hard multi-tubular structure having numerous apertures at one side only can, however, also be used for other purposes, for example, for insulation against moisture, because the moisture penetrating at one side cannot escape through the opposite closed walls of the tubes. Such a hard structure with a surface which is perforated on one side only can also be produced without a foil insert, for example in such a way that the hardening impregnation or coating on the upper and lower side of the fabric is applied in different thicknesses.

The basic method of the invention can also be so developed that the flat hose fabric is expanded by mandrels instead of by inflatable tubes, in which case the mandrel tool can, of course, be re-usable. In this event, the hollow sections comprise an impregnated fabric or coated fabric without a foil or like substance introduced internally for the purposes of the expansion, remaining behind.

In a further development of the method of the invention, it is proposed that the hollow sections should each be expanded or inflated into a rectangular or approximately rectangular or like cross-section. This can be effected by expanding the flat fabric directly into hollow sections with a rectangular shape, approximately rectangular or like shape, possibly by rectangular or substantially rectangular mandrels inserted into the hose fabric or by inflatable tubes introduced into the hose fabric, a surrounding mould having flat, closed, grid-like or other mould faces. The expansion into hollow sections of rectangular, approximately-rectangular or other cross-sectional geometry can, however, be effected by initially expanding the hoses into a circular cross-section and then additionally, before or after partial hardening of the coating to achieve the desired spatial shape, compressing into sections having a rectangular, approximately rectangular or other desired cross-section. A hard multi-tubular structure having a rectangular or approximately rectangular cross-section for its hollow sections has a lesser over-all height and larger contact surfaces between adjacent hollow sections than a comparable structure whose hollow sections are circular. Upon later processing, for example coating with plaster, with a flattened multi-tubular structure, the formation of a plaster layer having regions which are very close to each other, which naturally reduces the insulation capacity through bridge formation, is avoided; this will be explained further.

In a further development in accordance with the invention, it is proposed that the hoses should be expanded to circular cross-section and then compressed only over partial regions of their lengths to form them at the compressed regions into hollow sections of rectangular, approximately rectangular or other desired cross-section. Depending on the spacing between the devices uses for pressing, the cross-sectional geometry of the portions lying between the compressed regions may also be influenced to a greater or lesser degree.

A further proposal in accordance with the invention provides for the hose fabric to be impregnated or coated on both sides with materials of different properties, so that a multi-tubular structure with corresponding characteristics is produced.

BRIEF DESCRIPTION OF THE DRAWINGS

The invention will be described further, by way of example with reference to the accompanying drawings, it being understood that the following description is purely illustrative of the scope of the invention, variations from the described examples being possible.

In the drawings:-

DETAILED DESCRIPTION OF ILLUSTRATED EMBODIMENTS

Figure 1:
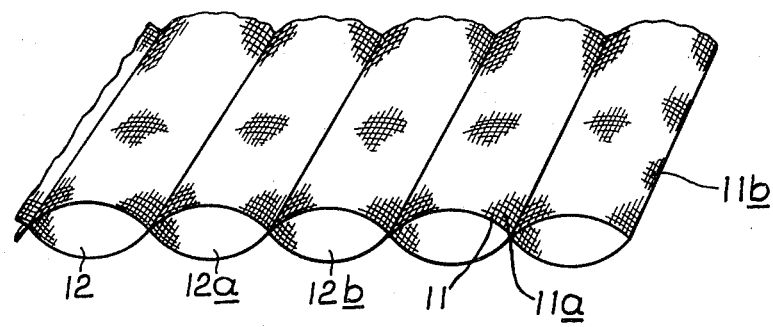
FIG. 1 is a diagrammatic perspective view of part of a length of flat hose fabric used in carrying out the method of the invention.

FIG. 1 shows a flat hose fabric 10 which comprises a plurality of side-by-side connected hoses and which, for the purposes of simplified representation, is shown with the plies of each hose somewhat arched but in practice is substantially flat. The fabric comprises weft threads 11, 11a, 11b, which in the representation of FIG. 1 extend from left to right and from right to left. These weft threads have, as will be evident from FIG. 1, sinusoidal configurations so that certain weft threads for example, lie in the upper half of the hose 12, in lower half of the hose 12a and subsequently the upper half of the hose 12b and so on, while oppositely woven weft threads form the lower half of the hose 12, the upper half of the hose 12a and the lower half of the hose 12b and so forth. The weft threads intersect at the junction lines between the adjacent hoses 12, 12a, 12b and so forth.

Figure 1A:
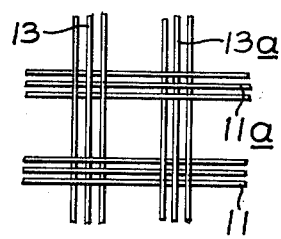
FIG. 1a is a diagrammatic enlarged detail illustrating the insections of the warp and weft yarn groups in the fabric of FIG. 1.

The weft threads 11, 11a and so on can be arranged in groups, as has been shown in FIG. 1a. Also the weft threads 11, 11a, 11b and so on can be incorporated at uniform or non-uniform spacings, as will be understood from FIG. 1b.

Figure 1B:
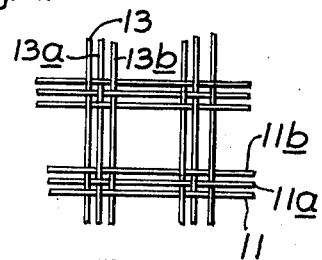
FIG. 1b is a view similar to FIG. 1a but illustrating an alternative possibility for the warp and weft yarn group intersections.

In the same way the warp threads 13, 13a can be present in the groups as shown in FIG. 1a and with uniform or non-uniform spacings as shown in FIG. 1b. The weave of the fabric can be such that as shown in FIG. 1a, the groups of weft threads and the groups of warp threads pass alternately under one another and over one another or, as shown in FIG. 1b, the individual weft threads and individual warp threads alternately pass over and under one another. The type of weave used in the flat hose fabric thus influences the displacement behaviour of warp and weft threads in the fabric and the mechanical properties of the eventual multitubular structure made therefrom.

Figure 2:
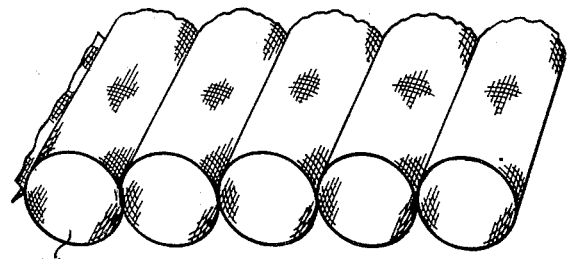
FIG. 2 is a view comparable with FIG. 1, but showing the hoses of the fabric expanded to circular cross-section as a step in carrying out the method of the invention.

FIG. 2 shows the flat hose fabric of FIG. 1 after expansion of the flat hoses thereof into tubes having a circular cross-section. Prior to or after the shaping from the flat configuration into the expanded shape of FIG. 2 the hose fabric is impregnated or coated with a substance or composition which hardens to form the fabric into the spatial shape shown in FIG. 2, the hardened fabric of FIG. 2 constituting an elementary embodiment of the hollow multi-tubular structure of the invention; suitable for some practical purposes. Preferably a heat-hardening or cold-hardening plastics material is used as the substance for the impregnation or coating.

FIGS. 1 and 2 show, at their right-hand selvedges, that the weft threads 11 are conducted back at the longitudinal edge of the hose fabric, along the free edge of the outermost hose thereof, so that the same weft threads form the upper side and the underside of the outer tube, as also is the case with the other tubes. Accordingly there emerges a particularly secure hold, more especially of the outer tube, since the weft threads are returned through 360°.

Figure 3:
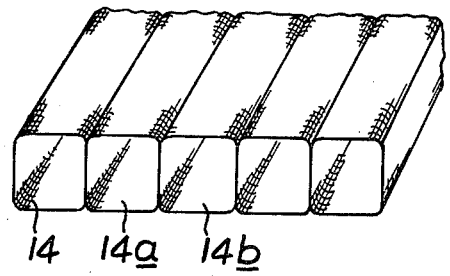
FIG. 3 is a view comparable with FIGS. 1 and 2, but showing the fabric after expansion and application of pressure thereto to form the hoses into hollow sections of approximately square cross-section.
Figure 4:
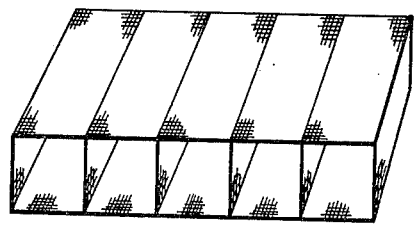
FIG. 4 is a view similar to FIG. 3 but showing the hoses having been compressed to substantially rectangular hollow sections.

FIG. 3 shows the hollow sections 14, 14a, 14b and so forth of the fabric of FIG. 2 can be reshaped to an approximately rectangular cross-sectional shape, by flattening them at the top and bottom. The case where an exact rectangular cross-sectional shape is achieved is shown in FIG. 4. With regard to the cross-sectional shapes in accordance with FIGS. 3 and 4 it should be commented that, in the same way as described with regard to FIG. 1, the weft threads alternately form the upper half of the one hollow section and the lower half of the next adjacent hollow section, so that secure connection of the hollow sections one with the other by the weft threads is afforded.

The expanding of the hoses into sections having a round, angular or other cross-section can be effected in various ways, which will be described further.

Figure 5:
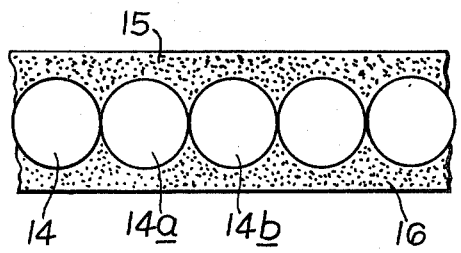
FIG. 5 is a sectional view through a hollow multi-tubular structure comprising the fabric as illustrated in FIG. 2 having a layer of plaster applied to its two opposite sides.
Figure 6:
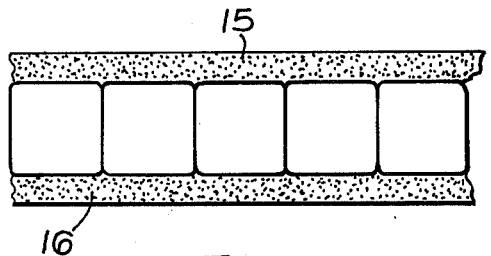
FIG. 6 is a sectional view through a hollow multi-tubular structure comprising the fabric illustrated in FIG. 3 having a layer of plaster applied to its two opposite sides.

FIG. 5 shows a vertical section through a hard multi-tubular structure which comprises a hose fabric, such as that of FIG. 2, hardened and provided on opposite sides with respective plaster layers 15 and 16. When the hoses have a circular cross-section there emerge between the individual hoses 14, 14a and 14b nearly solid x-shaped webs having high strength. At these webs, in other words in the region of adjoining hoses, such as the hoses 14 and 14a, through bridge formation between the two sides of the structure, poorer heat insulation is present than in the region of the apices of the tubes. In the case of a hard multi-tubular structure having hollow sections of rectangular cross-section, as is shown in FIG. 6, on the other hand, the insulating capacity is not impaired. In this case, the layers 15 and 16 of plaster have a substantially constant thickness. No bridge formation is present, because the adjacent hollow sections do not contact one another linerly, but areally. The uniform thickness of the layers 15 and 16 of plaster also leads to the fact that these have a substantially equal tension over their surfaces.

Figure 5A:
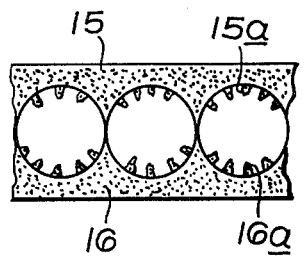
FIG. 5a is a view comparable with FIG. 5 but showing a modification in which the applied plaster is caused to protrude through the interstices in the hose fabric to form anchorages to resist separation of the plaster, when set, from the hose fabric.
Figure 5B:
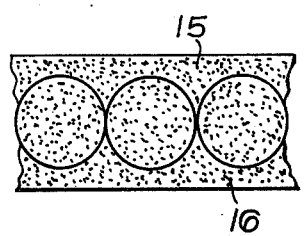
FIG. 5b is a view comparable with FIGS. 5 and 5a, but showing the the plaster having also been filled into the expanded hoses.
Figure 6A:
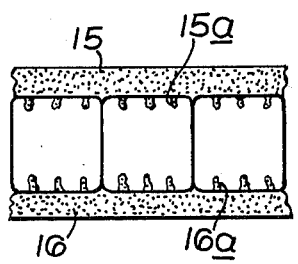
FIG. 6a is a view comparable with FIG. 6 but showing a modification in which the applied plaster is caused to protrude through the interstices in the hose fabric to form anchorages.
Figure 6B:
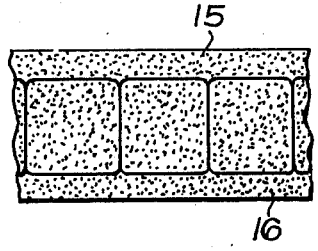
FIG. 6b is a view comparable with FIGS. 6 and 6a, but showing the plaster having also been filled into the expanded hoses.

Instead of the plaster layers 15 and 16, other coverings or coatings can be employed. These coatings 15 and 16 are not, of course, the coating or impregnation of the weft and warp threads which hardens to determine the spatial shape of the hollow sections; basically, however, both types of coating can be of the same material and be applied in one operation. The coatings 15 and 16 can be such that they enter into an adhesive bond with the multi-tubular structure. Conversely, the coating or impregnation of the weft and warp threads can be so selected that upon hardening it not only stabilises the spatial shape of the hollow sections, but at the same time enters into a secure adhesive bond with prepared coatings 15 and 16 already hardened in themselves, for example of metal. Thus the coating can by way of example by a composite plate of foam plastics material with an outer metal foil. The coatings 15 and 16, which are applied in the pasty state to the hard multi-tubular structure can, as shown in FIG. 5a and FIG. 6a, penetrate through the interstices in the fabric of the fabric hoses as at 15a and 16a into the interiors of the hollow sections so as to become mechanically anchored to the multi-tubular structure by formation of knobbed protrusions. The sinusoidal course of the weft threads ensures a positive and interlocking connection between the coatings 15 and 16; these coatings are so to speak anchored or sewn together by means of the weft threads running through. The material of the coatings 15 and 16 can also, as shown in FIGS. 5b and 6b, be filled into the hollow sections so as completely to fill the spaces of such hollow sections. The coatings 15 and 16, for example consisting of a plastics hard or soft foam, are then integrally introduced. The coating can, in this case, also be applied only on one side and pass through the apertures in the hard multi-tubular structure as far as the opposite side; in this case, the hard multi-tubular structure is, for example, for the purposes of reinforcing, embedded into the coating material.

Figure 7:
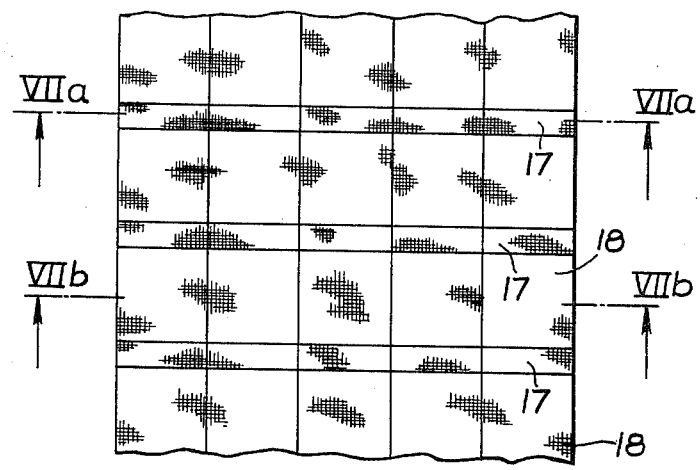
FIG. 7 is a plan view of another embodiment of the hollow multi-tubular structure of the invention.
Figure 7A:
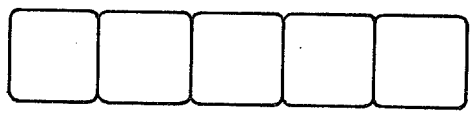
FIG. 7a is a sectional elevation taken on the line VIIa—VIIa of FIG. 7.
Figure 7B:
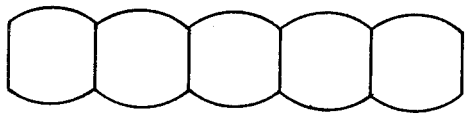
FIG. 7b is a sectional elevation taken on the line VIIb—VIIb of FIG. 7.

FIG. 7 is a plan view of a hard multi-tubular structure of which the hollow sections have different cross-sectional shapes over different parts of their lengths. Thus, in the regions 17, as shown by FIG. 7a, the hollow sections are plane-surfaced at the upper and lower walls, whereas these walls are arcuate in the regions 18, as shown by FIG. 7b. The hard multi-tubular structure with this spatial shape can be forced more easily into a pastry material, for example into a motar mess or bed, than hard structures in accordance with FIG. 3 and FIG. 4, by reason of the fact that the initial penetration is punctiform or linear and not areal.

Figure 8:
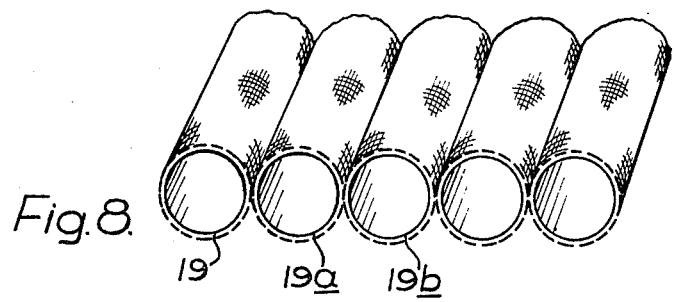
FIG. 8 is a prospective view, comparable with FIGS. 2, 3 and 4, but showing an embodiment of the hard multi-tubular structure of the invention wherein inserts or tubes of foil are provided in each of the hoses of the fabric.

The expansion of the flat hose fabric can be effected in various different ways. Thus it is possible, as shown diagrammatically, in FIG. 8, to introduce tubes 19, 19a, 19b and so on, for example made of plastics films, into the hoses of the hose fabric and then to expand these plastics film tubes by means of a gas, for example compressed air. In this way, the flat hoses of the fabric are caused to bulge. Prior to, or after, inflation of the tubes made of plastics film, the expanded hose fabric is provided with a coating, which hardens (or is caused to harden) and ensures the spatial shape of the hollow sections formed by the expanded hose of the fabric. This can be effected by immersing the hose fabric into a synthetic resin bath, by spraying on a cold-hardening or hot-hardening synthetic resin, by spreading on such a resin, or in any other suitable way. The application of the hardening coating can be effected either after or before the introduction of the plastics film tubes.

Figure 8A:
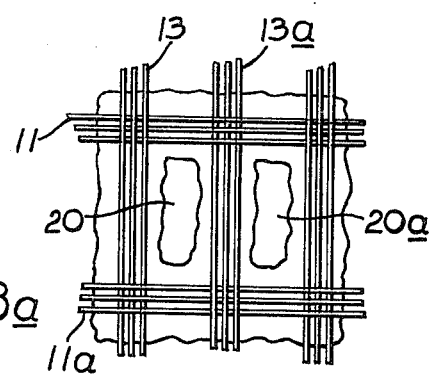
FIG. 8a is an enlarged fragmentary detail illustrating the warp and weft yarn group intersections in the fabric of the structure of FIG. 8 and showing also the foil inserts or tubes having been caused to tear open in register with the interstices in the hose fabric.
Figures 9, 9A:
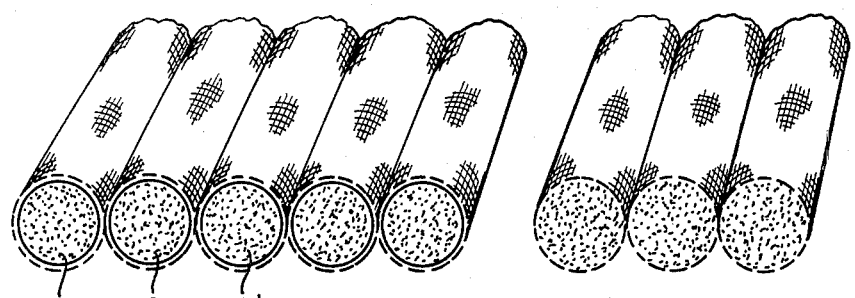
FIG. 9 is a view similar to FIG. 8, but illustrating a modification of the structure in which the expanded hoses have been filled with an insulating material.
FIG. 9a is a view similar to FIG. 9, but showing an embodiment wherein foil tubes or inserts are not provided in the hoses.

The hoses can be withdrawn, if desired, after they have fulfilled their functions of blowing-up and expanding, and when the hardening of the coating has progressed sufficiently to maintain the spatial shape of the expanded hollow sections. They can alternatively be left to remain in the hard multi-tubular structure and perform further functions. If the plastics tubes consist of a shrink film, heating thereof will result in tearing open of the film in register with the interstices between the groups of weft threads 11 and warp threads 13, as shown in FIG. 8a. If the heating is effected at one side only of the multi-tubular structure, for examples only at the upper side thereof, openings 20, 20a and so on arise in register with the fabric interstices only on the upper side of the hoses, whilst the undersides thereof remain closed. A multi-tubular structure of this kind can be used, for example, for drainage. If the impregnation or coatings of the hose fabric, to set the spatial shape thereof and for obtaining corresponding stiffness, is effected, for example, using thermosetting plastics materials, the subsequent heating so as to cause the expansion tubes of shrink foil to tear open can be effected simply and without risk of damage to the hollow sections. FIG. 9 shows a hard multi-tubular structure having film or plastics tubes 19, into which filler, for example insulation material, is introduced. Advantageously, these are introduced with the inflation of the film tubes by way of the inflating air stream. The filler can, for example, consist of mineral fibres. Alternatively small foam material pellets, granules or chips can be used.

Also foaming materials or rods can be introduced into the expanded hoses of the multi-tubular structure of the invention. FIG. 9a shows a hard multi-tubular structure without any inserted foil tubes, and in which the interiors of the hollow sections are filled with a filler, for example with mineral fibres.

Figure 10:
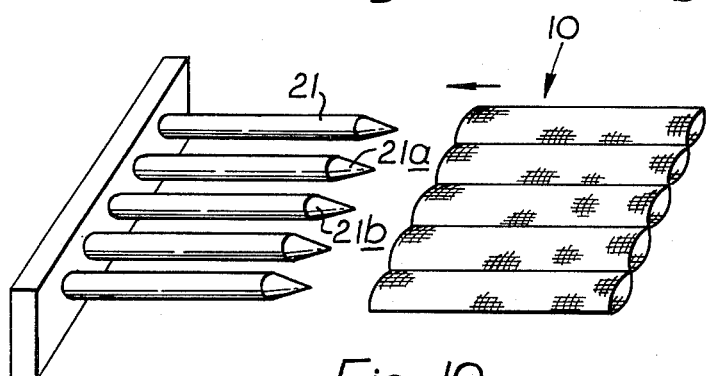
FIG. 10 is a perspective view illustrating how the hoses of the hose fabric can be expanded by means of mandrels, in carrying out the method of the invention.
Figure 11:
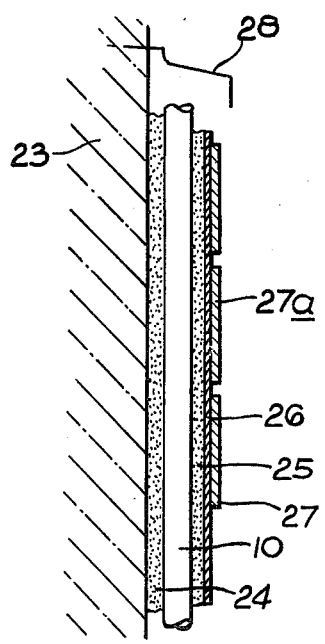
FIG. 11 is a fragmentary sectional side elevation showing how the hollow multi-tubular structures of the invention may be used to provide the facade of a building.
Figure 12:
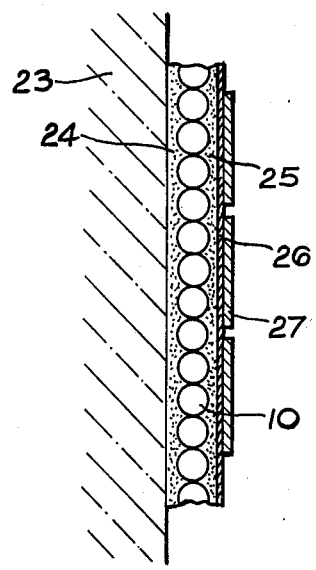
FIG. 12 is a sectional plan view corresponding to FIG. 11.

FIG. 10 shows how mandrels 21, 21a 21b or the like can be introduced into the hose fabric to expand or open up the hoses thereof. The mandrels are advantageously such that, or are so treated that they do not combine with or become adhered or bonded to the hardening impregnation or coating of the hose fabric and can easily be withdrawn once more from the expanded fabric. For the faster hardening of the impregnation or coating, the mandrels 21, 21a, 21b and so on can also be heatable. FIGS. 11 and 12 show an exemplary use of the hard multi-tubular structure of the invention. Indicated by numeral 23 is a building wall, to which a multi-tubular structure 10 of the invention has been adhered or bonded by a tile adhesive or mortar 24. This structure 10 is faced at its front surface with mortaring 25 which can corresponding to the plaster layer 15 of the embodiment of FIGS. 5 and 6. Over the structure 10 is applied a frostproof tile adhesive 26 which holds tile coverings 27, 27a and so on. Indicated by numeral 28 is a rain covering which is pervious to air. From FIG. 12 it can be seen that the hollow sections have a circular cross-section and the mortaring 25 has a non-uniform thickness, whilst x-shaped webs are formed between the adjacent hollow sections. These webs are avoided if the hollow sections have the rectangular cross-section shown in FIG. 6.

I claim:

1. A method of making a hard multi-tubular structure which comprises: producing a flat hose fabric composed of a plurality of side-by-side abutting hoses, introducing uninflated foil tubes of thermoplastic shrink film into each of the hoses of the fabric, the tubes being of substantially the same length as the length of the fabric, inflating the tubes for expanding the hoses into formed hollow sections, treating the fabric with a hardening material, allowing hardening of the hardening material and setting of the fabric with the hoses in expanded condition, and leaving the tubes after setting of the hose fabric in the respective hollow sections free of any internal inflating pressure, and heating the resultant structure for the creation of perforations in the shrink film.

2. A method of making a hard multi-tubular structure which comprises: producing a flat hose fabric composed of a plurality of side-by-side abutting hoses, introducing uninflated foil tubes into each of the hoses of the fabric, the tubes being of substantially the same length as the length of the fabric, initially expending the hoses into circular cross section configurations, inflating the tubes for expanding the hoses into formed hollow sections, treating the fabric with a hardening material, allowing hardening of the hardening material and setting of the fabric with the hoses in expanded condition, after a partial setting of the fabric compressing the hoses each into substantially rectangular cross-section, and leaving the tubes after setting of the hose fabric in the respective hollow sections free of any internal inflating pressure.

3. A method of making a hard multi-tubular structure which comprises: producing a flat hose fabric composed of a plurality of side-by-side abutting hoses initially expanding the hoses into configurations of circular cross section, introducing uninflated foil tubes into each of the hoses of the fabric, the tubes being of substantially the same length as the length of the fabric, inflating the tubes for expanding the hoses into formed hollow sections, treating the fabric with a hardening material, allowing hardening of the hardening material and setting of the fabric with the hoses in expanded condition, compressing the hoses at partial regions along their lengths into sections of substantially rectangular cross-section after a partial setting of the fabric, and leaving the tubes after setting of the hose fabric in the respective hollow sections free of any internal inflating pressure.

4. A method of making a hard multi-tubular structure which comprises: producing a flat hose fabric composed of a plurality of side-by-side abutting hoses, introducing uninflated foil tubes each of the hoses of the fabric, the tubes being of substantially the same length as the length of the fabric, inflating the tubes for expanding the hoses into formed hollow sections, treating the fabric with a hardening material, allowing hardness of the hardening material and setting of the fabric with the hoses in expanded condition, leaving the tubes after setting of the hose fabric in the respective hollow sections free of any internal inflating pressure and applying to the fabric in its set condition a covering which engages through the interstices the threads of the hose fabric to anchor the covering mechanically to the hose fabric.

5. A method of making a hard multi-tubular structure which comprises: producing a flat hose fabric composed of a plurality of side-by-side abutting hoses, introducing uninflated foil tubes into each of the hoses of the fabric, the tubes being of substantially the same length as the length of the fabric, inflating the tubes for expanding the hoses into formed hollow sections, treating the fabric with a hardening material, allowing hardening of the hardening materials and setting of the fabric with the hoses in expanded condition, leaving the tubes after setting of the hose fabric in the respective hollow sections free of any internal inflating pressure, and filling the interiors of the hollow sections with a material similar to that of the covering.

* * * * *